United States Patent [19]
Lester

[11] 3,805,265
[45] Apr. 16, 1974

[54] RADIANT WAVE LOCATING SYSTEM

[75] Inventor: Robert W. Lester, Manhasset, N.Y.

[73] Assignee: RCDS Enterprises, Inc., New York, N.Y.

[22] Filed: Oct. 6, 1971

[21] Appl. No.: 186,877

[52] U.S. Cl.............. 343/6.5 R, 340/16, 340/312
[51] Int. Cl.............................................. G01s 9/58
[58] Field of Search......... 343/6.5 R, 6.5 LC, 6.8 R, 343/6.8 LC, 112 TC; 340/311 X, 16 R, 312 R, 312 X, 164; 325/8

[56] References Cited
UNITED STATES PATENTS

| | | | |
|---|---|---|---|
| 3,715,726 | 2/1973 | Wallin et al. | 340/311 X |
| 3,573,630 | 4/1971 | Baer | 340/311 X |
| 3,439,320 | 4/1969 | Ward | 340/16 R |
| 3,634,826 | 1/1972 | Biedermann | 340/164 |
| 3,696,384 | 10/1972 | Lester | 340/312 |
| 3,270,338 | 8/1966 | Watters | 325/8 X |
| 3,657,715 | 4/1972 | Curtin | 340/311 |
| 3,175,191 | 3/1965 | Cohn et al. | 340/311 X |
| 3,611,361 | 10/1972 | Gallichotte et al. | 343/6.5 LC |
| 2,864,243 | 12/1958 | Schultz | 343/6.5 R |
| 3,151,323 | 9/1964 | Baldridge | 343/6.5 R |
| 3,432,851 | 3/1969 | Cox, Jr. et al. | 343/6.5 R |
| 3,369,239 | 2/1968 | Perkinson et al. | 343/112 TC |

*Primary Examiner*—Benjamin A. Borchelt
*Assistant Examiner*—Harold Tudor
*Attorney, Agent, or Firm*—Greene & Durr

[57] ABSTRACT

A radiant wave electronic locating system for automatically locating a select group of persons or objects within a selected area of surveillance. Room sensors and a central console are linked together by radiant wave energy signals, which as light waves, acoustic waves, ultrasonic waves, microwaves, etc., which are coded and transmitted from the central console to track, locate or page a particular person. In one embodiment, signal transducers are common to a hallway and a room and transmit a coded signal present in the hallway into each adjoining room to page a personal pocket unit. In another embodiment, transceivers transmit a coded radiant wave signal in chain reaction from room to room by means of transceivers having a remote transducer, disposed through the wall of the room, to transmit the coded signal to the adjoining room. In a third embodiment of the invention, coded signals are transmitted throughout the rooms by carrier current at a selected frequency and one of three transducers present in the room units are activated to page the personal pocket unit of the person to be located. The pocket units receive the transmitted signal at the selected frequency, and transmit a return signal at another selected frequency to the room unit, where this signal is encoded to a third frequency, and transmitted in chain reaction from room to room back to a transducer on the central console. The returned signal is then decoded to determine the location of the person. A pocket unit in the shape of a writing pen for use with the locating system is also disclosed.

7 Claims, 6 Drawing Figures

INVENTOR.
ROBERT W. LESTER

BY

ATTORNEY.

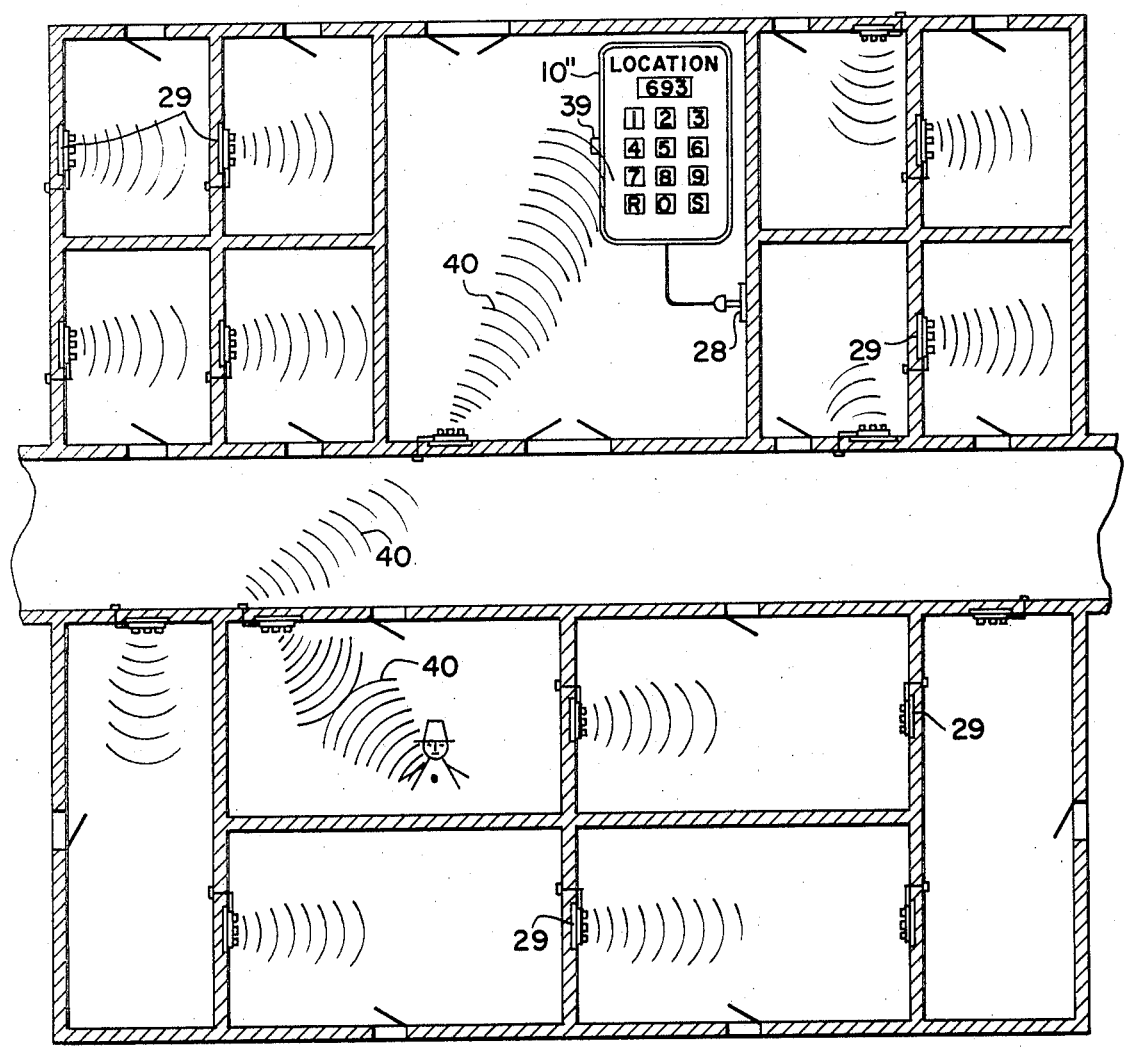
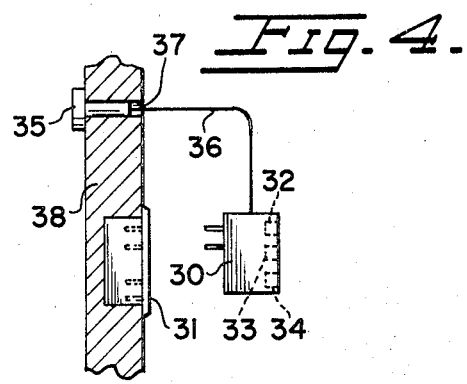
Fig. 4.
Fig. 5.
INVENTOR.
ROBERT W. LESTER

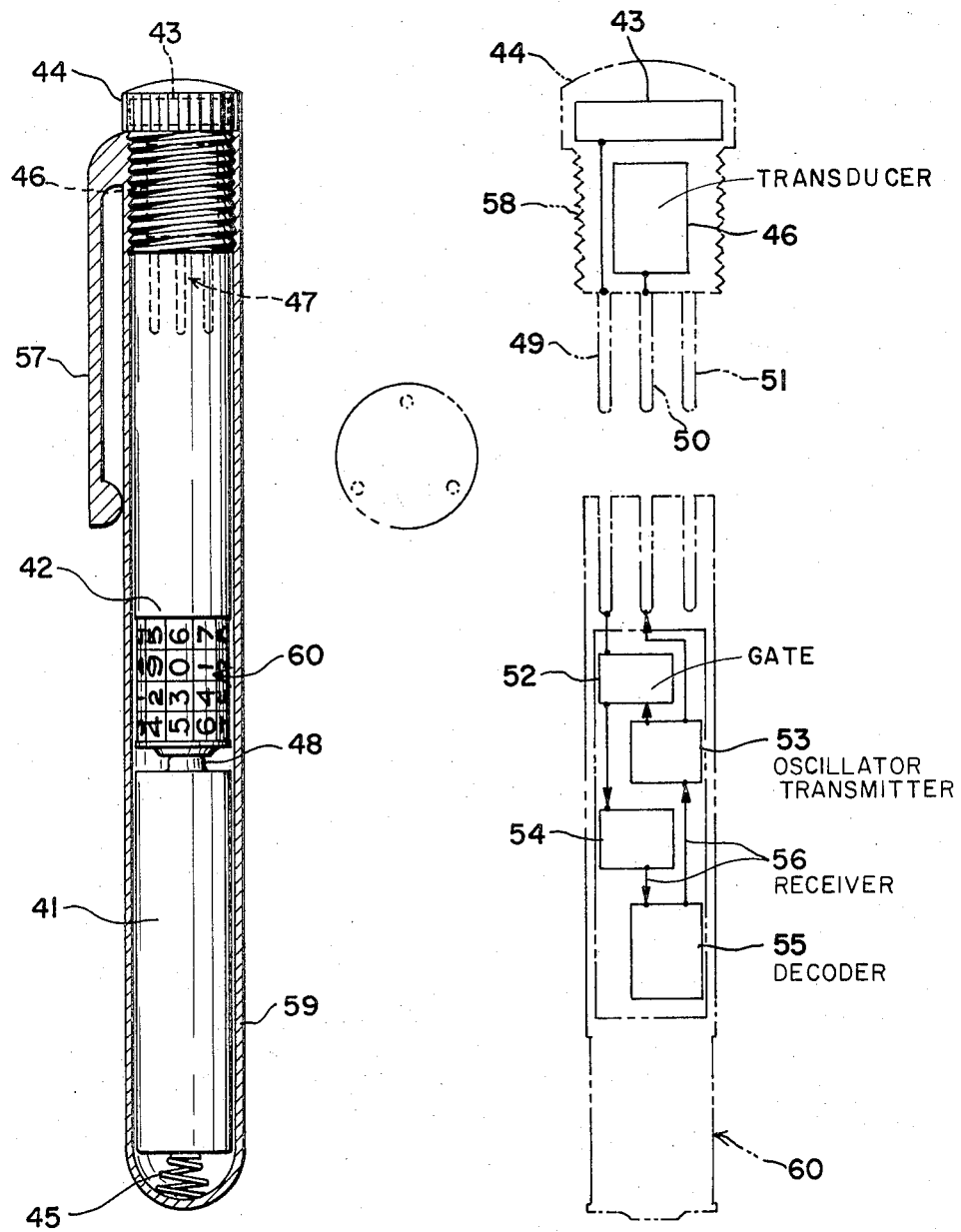

3,805,265

RADIANT WAVE LOCATING SYSTEM

The present invention relates to paging and locating systems, and in particular, to radiant wave electronic tracking and locating systems for automatically locating a select group of persons or objects within a selected area of surveillance. A locating system of this type is disclosed in the applicant's co-pending U.S. Pat. application, Ser. No. 160,851, filed on July 8, 1971, entitled "Ultrasonic Tracking and Locating System," now U.S. Pat. No. 3,696,384.

In electronic tracking and locating systems, such as those described in the above-mentioned pending patent application, the great number of wires needed to connect remote room transducers with the central control console are additional hardware materials which unduly add to the expenses involved in constructing and installing the locating system, especially in systems having a large area of surveillance.

Accordingly, the applicant discloses an improved locating system in which room sensors and a central console are linked together entirely by radiant-wave energy signals. In the novel system, a radiant-wave energy signal, such as a light, acoustic, ultrasonic, microwave, etc., signal is transmitted from the central console throughout the selected area of surveillance and is coded to identify a particular object or individual to be located. The transmitted signal is received by receiving means selectively disposed about the area of surveillance, such as in the rooms of a building, which transmit the signal transmitted by the console into adjacent defined areas of surveillance, such as adjacent rooms. The signals transmitted into each room activate portable transducers carried by each individual or object which receive the signals transmitted and decode them to determine if the form is unique to the individual present in the room. If the signal transmitted is the code used to identify the person, the transducer transmits a signal which is received and transmitted back to the central console by the room sensor unit to give the location of the person. The system may be constructed so that each of the room sensor units is a transducer which transmits the signal in series from the central console to each adjoining room or hall; or a plurality of units which are common to one room or area, such as hallway, may be provided, and the signal transmitted into the common hallway or room so that all of the units will transmit the signal into the rooms under surveillance at approximately the same time.

It is therefore an object of the present invention to provide an electronic locating system in which the remote room units, mobile pocket units, and central console are coupled together entirely by radiant-wave energy.

It is another object of the present invention to provide an improved electronic locating system which is simple in design, easy to manufacture, and efficient and reliable in operation.

Other features of the present invention will become apparent from the following detailed description taken in connection with the accompanying drawings which disclose several embodiments of the invention. It is to be understood, however, that the drawings are designed for the purpose of illustration only, and not as a definition of the limits of the invention.

In the drawings, wherein similar reference characters denote similar elements throughout the several views:

FIG. 4 is a schematic diagram of another embodiment of a radiant-wave electronic locating system constructed in accordance with the present invention;

FIG. 5 is an enlarged perspective view of an ultrasonic transducer illustrated in the embodiment shown in FIG. 4; and FIG. 6 is a cross-sectional side view of one embodiment of a pocket unit transducer which may be used with the locating system shown in FIGS. 1, 2 and 4.

Figure 1:
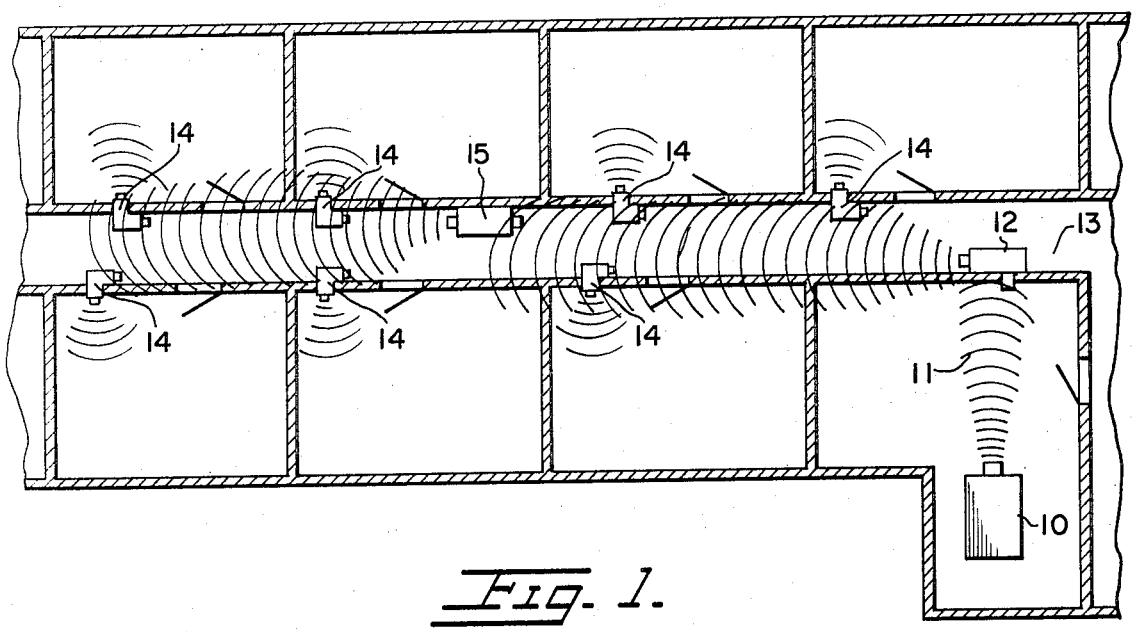
FIG. 1 is a schematic diagram of a radiant-wave energy electronic locating system constructed in accordance with the present invention.

Referring to the drawings, in particular to FIG. 1, there is shown a radiant-wave electronic locating system consisting of a console 10 which radiates a coded radiant-wave signal 11 in response to the programming of a person's identification code on a keyboard into the console by an operator. This signal may be, for example, an ultrasonic signal, in which case signal 11 is received and transmitted by an ultrasonic transducer repeater or amplifier 12 down hallway 13 to the ultrasonic room units 14 and another hallway repeater and amplifier 15. As signal 11 is transmitted through hallway 13, each of the room unit transducers 14 transmits the coded signal into the adjacent rooms to page the pocket unit of the person desired to be located. The transducers 14, and the repeaters 12 and 15, are two-way transducers, i.e., signals may be transmitted to and from the console. If a person to be located is within one of the rooms into which the signal is transmitted, the pocket unit of the person decodes the coded signal, identifies it as being the identification code of that person, and transmits a return signal into the room which is then received by the ultrasonic transducer 14 and transmitted along hallway 13 to repeaters 15 and 12 and console 10, where the return signal is decoded to determine the location of the person. The encoding of the identification signal, and the decoding of the return signal, is carried out by console 10, which is more fully described in the applicant's above-mentioned, co-pending patent application.

It should be noted that the system described above may be used as a one-way paging system, in which the pocket unit of the person is activated to produce an audible sound of vibration to indicate to the person that he is being paged, or it may be used as a two-way system as just described, to determine the remote location of a person within a particular area of surveillance at a centrally located control console.

The system just described is a total acousticly coupled system. However, optical techniques may also be used to transmit the coded identification signals. In an optical system, infrared, visible, ultraviolet, laser or conventional light may be used. However, an optical system is only practical for a one-way paging system, not a locating system, since the requirement of having a light source directly outside of each room is impractical. Also, unlike the optical method, the acoustic method allows the frequencies in the hallway to be different than the frequencies in the rooms themselves.

It should be noted that since there are two paths of communication within the above-described locating system, i.e., one within the room in which the coded identification signal is broadcast and in which the pocket unit of the paged person makes a response, and the other outside the room, coupling the room to the central console, different modes of communication or signal transmission may be used to couple the console to the room units. For example, acoustic waves may be used within the rooms, and optical waves used in the hallways. Other possible combinations are acoustic-acoustic, rf-acoustic, and rf-optical. In the operation of an acoustical-optical system, for example, a pulsed source of ultraviolet light or a laser beam is beamed down hallway 13 near the ceiling by an optical transducer 12. Assuming that the beam of light is wide enough to fill the hallway, small photocells mounted in the end of acoustical-optical transducers 14 in hallway 13 receive the pulsed light beams, and transmit the code to ultrasonic transducers looking into the rooms. The transducers emit pulse-coded ultrasonic signals under control of the pulsed light beam. If a return signal from a pocket unit is received by a room transducer, an ultraviolet light source located in the acoustical-optical transducer in the hallway is activated. The ultraviolet light is pulse coded by the transducer and beamed back towards the console, where identification of the room from which the signal originated is made.

In the operation of a system in which transmission is entirely by acoustical methods, console 10 is provided with an acoustical coding device and an acoustical transmitter for transmitting a coded acoustical signal down hallway 13. An acoustical pickup disposed in the hallway in transducer 14 receives the signal and transmits it through the wall of the room to a transducer in the room. The room transducer then transmits an acoustical signal having the same modulation as that transmitted down hallway 13. The frequency of the acoustic signal within the room does not necessarily have to be the same as that of the signal in the hall, and it is preferably not the same. In every room communicating with hallway 13, the same coded signal is radiated substantially simultaneously. If, as previously described, a personal pocket unit programmed to respond to the code, is located in the room, an uncoded, ultrasonic signal is transmitted into the room by the pocket unit and is received by the room transducer. The frequency of the signal transmitted by the pocket unit thus need not be the same as that of the acoustic signal transmitted down the hallway, or radiated in the rooms. For identification purposes, it is better that the signal has a different frequency. In response to the acoustic signal transmitted by the pocket unit, the transducer disposed in the hallway transmits another coded signal back through the hallway to console 10. When the signal is received by the console, it is decoded to determine the room from which the signal originated. The location of the person desired is then displayed on the console.

Figure 2:
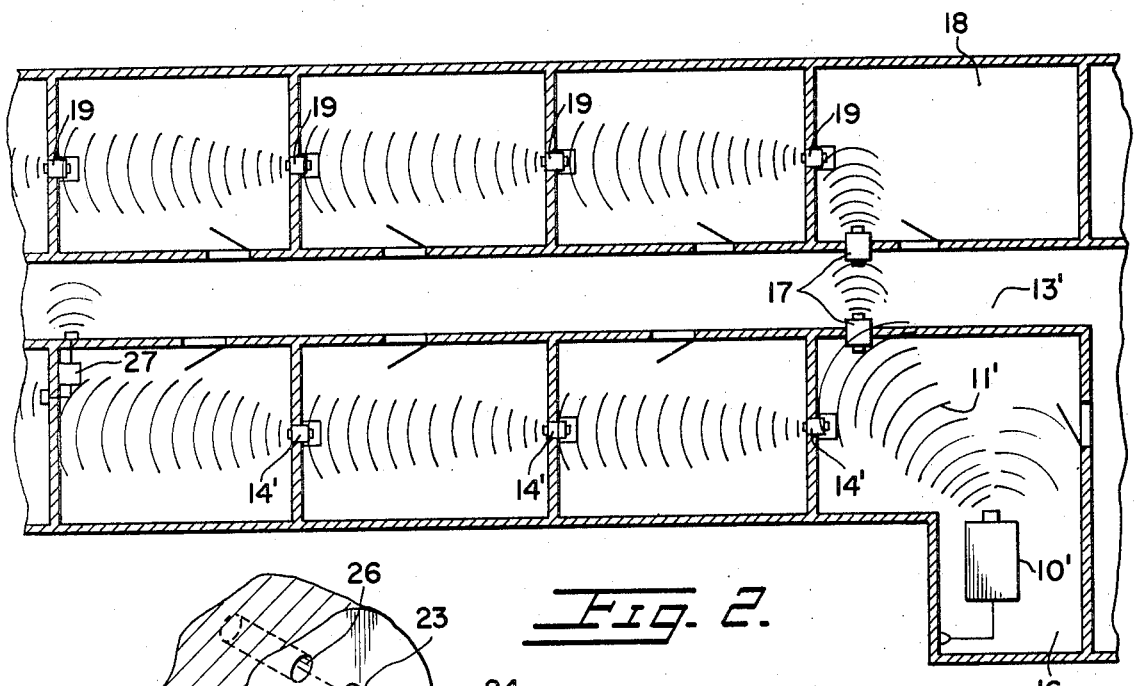
FIG. 2 is a schematic diagram of another embodiment of a radiant-wave electronic locating system constructed in accordance with the present invention.
Figure 3:
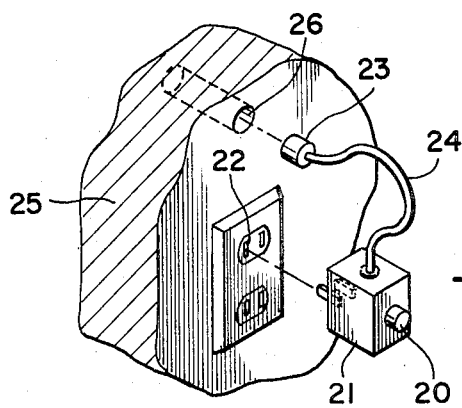
FIG. 3 is an enlarged perspective view of an ultrasonic transducer illustrated in the system shown in FIG. 2.

In FIG. 2, there is shown a total acoustic, room-to-room, one-way paging system. Console 10' transmits a coded acoustic signal into room 16. Signal 11' is then transmitted successively, in chain-reaction, to each adjoining room on one side of hallway 13' by room transceivers 14'. The signal is transmitted across hallway 13' into room 18 by transducers 17. Transceivers 19 transmit the coded signal successively, in chain-reaction, to each adjoining room on the other side of hallway 13'. Transceivers 14' and 19 are shown in detail in FIG. 3, and include a transducer 20 protruding from receiver 21 which plugs into wall outlet 22, and a second transducer 23 coupled to receiver 21 by means of cable 24. Transducer 23 is disposed through wall 25 in aperture 26 so that a signal received in one room is transmitted by transducer 23 to the adjoining room. In this manner, acoustic signal 11' is transmitted to each adjoining room successively as illustrated in FIG. 2. The transceiver may be modified to provide two transducers coupled to the receiver by cables, as illustrated by transceiver 27, so that additional coverage of two rooms, or a room and hallway, may be provided.

It should be noted that the above described system is useful for a paging system only, i.e., where the personal pocket unit of the person is activated in response to a predetermined code to transmit an audible or other perceptible signal to the person. If the system were used for a two-way locating system, the return signal transmitted by a pocket transducer would not return to the console, as required, but would be reflected in chain reaction throughout the entire surveillance area as the coded identification signal would be.

Referring to FIG. 4, there is shown another embodiment of a locating system constructed in accordance with the present invention. Central console 10'' transmits a pulsed carrier current signal at 30 kc on 110 volts AC housewiring through wall outlet 28. Systems of this type, and their operation, are fully described in another copending U.S. Pat. application of the applicant, Ser. No. 160,851, filed May 24, 1971, entitled "An Electronic System for Locating." Each room contains a combined ultrasonic transceiver and carrier current receiver 29 which transmits and receives on three different frequencies to enable the system to be used as a two-way paging system. Each of the personal pocket units carried by the persons to be located receives ultrasonic signals at 30 kc and transmits a return signal at 40 kc. As shown in detail in FIG. 5, each of the transceivers comprises an ultrasonic transmitter and carrier current receiver 30 which plugs into the wall outlets 31 of the rooms. Three transducers, 32, 33 and 34, are provided for transmitting and receiving ultrasonic signals and transmit coded ultrasonic signals at 30 kc which are received by the personal pocket units. If the code transmitted by transducer 32 is identical to the identification number of a person located in the room, his pocket unit transmits a 40 kc signal into the room after the decoding pulses terminate. The 40 kc signal is received by transducer 33 which encodes the return signal from 40 kc to 50 kc for transmission back to the console. Transducer 34 is coupled to the ultrasonic transducer 35 by cable 36. This transducer is disposed through an aperture 37 in wall 38 of the room. The encoded 50 kc signal is transmitted by transducer 35 into the room adjoining the transceiver so that the signal is transmitted successively room to room in chain-reaction until it reaches console 10''. The console has a transducer 39 which receives the signal transmitted into the room. The transmission path of the signals from the personal pocket unit to the console is illustrated by signals 40 in FIG. 4.

The room sensors may be dual units in order to provide return identification for halls or other rooms. A time delay of approximately one second is preferably included in each unit in order to wipe out any feedback that may occur. With the above-described system, there is no wiring needed for the return signal, and false triggering is eliminated.

In each of the systems described above, means are provided for transmitting an identification signal, which is received by the personal pocket units, throughout the area of surveillance. The form of this signal is such as to uniquely identify the individual being paged, and allow every member of the particular group to receive and decode the signals to determine whether or not he is being paged. Means are also provided to return a locating signal to the source of the transmitted identification signal. Only the personal pocket unit paged originates such a signal, and the locating signal is unique in form to the location from which it originates. It should be noted that the exact form or type of identification signal transmitted is not restricted, but merely must be unique to the individual being called. RF, carrier frequency, audible, and ultrasonic signals, for example, may be used in the systems, and the uniqueness of form of the signal may be provided by using, for example, a different RF frequency for each person, RF modulation with coded audio frequency tones, or pulse code modulation. The exact form chosen is arbitrary, and the above description is not intended to limit the invention to the use of the illustrated signals.

In FIG. 6 there is shown a personal pocket unit which may be used with the locating system previously described. The pocket unit has the size and shape of a conventional writing pen, so as to be carried in the shirt or suit jacket pocket of the person inconspiciously, and responds with an audible tone or inaudible ultrasonic signal in response to the reception of an appropriately coded ultrasonic signal transmitted from the room units of the locating system. Battery 41 is disposed within the lower end of the pen, and supplies power to electronic circuit module 42 and an ultrasonic transducer 43 which is disposed within a detachable transducer head 44. The battery is kept in contact with electronic circuit module 42 by means of springs 45. Audible transducer 46 may also be disposed within transducer head 44 if the pen is to be used as a paging unit. In most applications, transducer head 44 will have either ultrasonic transducer 43, or audible transducer 46 and transducer 43 together.

Circuit module 42 has a cylindrical shape, and is coupled to transducer head 44 by triple-pin electrical coupling 47. Module 42 is coupled to battery 41 by means of an electrical contact (not shown) disposed on the bottom surface of the module which engages terminal 48 of the battery. Pin 49 on transducer head 44 is coupled to ultrasonic transducer 43 to activate it when the pen is used as a locater. Pin 50 is coupled to audible transducer 46 to activate the tone transmitter when the pen unit is used as a pager. Pin 51 is the ground for the system.

Module 42 comprises a gate (or electronic switch) 52, an oscillator-transmitter 53, an ultrasonic receiver 54, and a 10 bit digital decoder 55. These elements are coupled together as indicated by arrows 56. As can be seen from the drawings, when the system is used as a pager, the gate circuit 52 is not required, and the output of oscillator 53 is fed directly through pin 50 to audible transducer 46. The gate 52 may be integrally formed with the pen clip 57 so that the unit may be switched on and off by depressing the clip. However, this feature is optional, since the unit is preferably left "on" continuously. Transducer head 44 is also provided with a threaded cylindrical portion 58 which is received by a similar threaded portion in the tubular casing 59 of the pen. To insert the electronic circuits in the casing, battery 41 is first disposed therein, and transducer head 44 connected to circuit module 42 by slidably disposing pins 49, 50 and 51 in the receptacles provided. The entire structure is then screwed into the open end of pen casing 59.

The electronic circuits of circuit modules 42, are comprised of two or more integrated circuits cemented or bonded to a common substrate which is fabricated from either a glass-filled epoxy or a ceramic material such as aluminum oxide. All semiconductor and resistive circuit elements, and smaller capacitive elements, are included in the integrated circuit. Larger capacitors and inter-connecting wiring are applied to the circuit board using thin film techniques.

The pen unit may also include a plurality of rotary switches 60 which enable the code of the personal pocket unit to be manually set to respond to a particular 10 bit digital signal. The decoder 55 will then detect the presence of the binary number for which it has been set by switches 60, and produce an output signal to activate either transducer 43 or audible transducer 46. It should be noted that transducer 43 is unidirectional, and will direct transmitted ultrasonic signals upward to the ceiling of the room, while the transducers in the room sensors are omnidirectional through 180° to insure coverage of the entire area.

While only several embodiments of the present invention have been shown and described, it will be obvious to those persons skilled in the art that many changes and modifications may be made thereunto without departing from the spirit and scope of the invention.

What is claimed is:

1. An electronic tracking and locating system for automatically locating at least one of a select group of individual objects disposed within a selected area of surveillance, comprising:

means for generating and transmitting a radiant wave identification signal throughout the selected area of surveillance which includes a plurality of separately defined areas separated by walls, the form of said signal being unique with respect to the individual or object to be located, including a keyboard having a plurality of manually operated buttons, each representing a selected numerical digit for enabling the identification code of a particular person or object to be entered therein, means for encoding the radiant wave identification signal representing the identification code of a person or object entered in said keyboard, and at least one signal transducer coupled to said encoding means for transmitting said identification signal to defined areas of surveillance of the locating system;

receiving and decoding means, remote from said identification signal generating and transmitting means, and carried by each individual or object within the select group, including a receiver for receiving said transmitted identification code signal, means for decoding said received signal, coupled to said receiver, an oscillator coupled to said decoding means, gate means coupled to said oscillator, and a transducer coupled to said gate for transmitting an acoustic output signal in response to an output signal generated by said oscillator in response to the reception of an identification code signal corresponding to the identification code of the person carrying said receiving and decoding means;

a set of signal transducers, one disposed within each of said separately defined areas of surveillance within the area of surveillance, and each being coupled to said Keyboard and encoding means through 115 volt 60 cycle electrical transmission wires;

carrier current transmission means, for transmitting said identification code signal at a selected frequency over said electrical transmission wires to said first set of transducers, said transducers being coupled to the wall outlet receptacles in each defined area of surveillance, for reproducing said identification code signal;

a set receiving and transmitting means, each having a transducer located in one of the selectively disposed separated areas throughout the area of surveillance, for receiving said acoustic transmitted output signal from said receiving and decoding means, and each having a transducer and coupling therefor extending into an adjacent area for transmitting a location identification signal the form of which uniquely identifies the location within the area of surveillance of the original receiving and transmitting means whereby to transmit said identification signal back to a central location within the area of surveillance; and means, disposed at said central location within the area of surveillance, for receiving and decoding said location identification signal and indicating the location of the person or object located.

2. The electronic tracking and locating system as recited in claim 1, wherein said identification code signal transmitting means further comprises, a second signal transducer, disposed within each of said defined areas of surveillance for receiving an output signal from said identification code signal receiving and decoding means, said signal being transmitted at a second selected frequency, means, including a third signal transducer, coupled to said second transducer, for encoding said received output signal and transmitting said signal at a third selected frequency into said defined area of surveillance, a fourth transducer, coupled to said third transducer, and disposed in an adjoining defined area of surveillance, for radiating said encoded signal at said third selected frequency in said adjoining selected defined area of surveillance, and a fifth transducer, coupled to said location identification signal receiving means, for receiving signals transmitted from said third and fourth transducers at said third selected frequency, said location identification signal being transmitted successively in chain reaction from each adjoining defined area of surveillance to another to said location identification signal and decoding means, thereby indicating the location of the person to be located.

3. The electronic tracking and locating system as recited in claim 2, wherein said remote receiving and decoding means receives said identification code signal at a first selected frequency, and transmits said output signal in response thereto at a second selected frequency.

4. An electronic paging system for automatically locating at least one of a select group of individuals or objects disposed within a selected area of surveillance, comprising:

means for generating and transmitting a radiant wave identification signal throughout the selected area of surveillance which includes a plurality of separately defined areas separated by walls, the form of said signal being unique with respect to the individual or object to be located, including a keyboard having a plurality of manually operated buttons, each representing a selected numerical digit for enabling the identification code of a particular person or object to be entered therein, means for encoding the radiant wave identification signal representing the identification code of a person or object entered in said keyboard, and at least one signal transducer coupled to said encoding means for transmitting said identification signal to defined areas of surveillance of the locating system;

receiving and decoding means, remote from said identification signal generating and transmitting means, carried by each individual or object within the select group, including an ultrasonic receiver for receiving said transmitted identification code signal, means for decoding said received signal coupled to said receiver, an oscillator coupled to said decoding means, and an audible tone transmitter, coupled to said oscillator, for transmitting an audible tone perceptible by the person carrying said remote receiving and decoding means, upon reception of an identification code signal corresponding to the identification code of the person or object carrying said receiving and decoding means;

said means for generating and transmitting the radiant wave identification signal including a plurality of ultrasonic transceivers, each having a first transducer disposed within one of said separately defined areas of surveillance, and a second transducer, coupled to its tranceiver by a cable, and disposed in an adjacent one of said separately defined areas of surveillance for transmitting said identification code signal in chain reaction throughout said separately defined areas of surveillance.

5. The electronic tracking and locating system as recited in claim 4 wherein said remote receiving means further comprises, an elongated tubular casing open at one end, having a threaded portion provided on the inside surface thereof at said open end, a detachable cap, having said transducer disposed therein and an electrical coupling element affixed thereto for electrically and mechanically coupling said transducer head and said decoder, receiver, oscillator and gate, a threaded portion being provided on the outside surface thereof, for threadably engaging the open end of said casing, and thereby securing the electronic circuits of the unit therein.

6. The electronic tracking and locating system as recited in claim 5, further comprising a plurality of manually operated rotary switches, coupled to said decoding means, receiver, oscillator and gate, of said remote receiving and decoding means, for setting said remote receiving and decoding means to respond to a selected identification code.

7. An electronic tracking and locating system for automatically locating at least one of a select group of individuals or objects disposed within a selected area of surveillance, comprising:

means for generating and transmitting a radiant wave identification signal throughout the selected area of surveillance, which includes a plurality of separately defined areas separated by walls, the form of said signal being unique with respect to the individual or object to be located, including a keyboard having a plurality of manually operated buttons, each representing a selected numerical digit for enabling the identification code of a particular person or object to be entered therein, means for encoding the radiant wave identification signal representing the identification code of a person or object entered in said keyboard, and at least one signal transducer coupled to said encoding means for transmitting said identification signal to defined areas of surveillance of the locating system;

receiving and decoding means, remote from said identification signal generating and transmitting means, and carried by each individual or object within the select group, including a receiver for receiving said transmitted identification code signal, means for decoding said received signal, coupled to said receiver, an oscillator coupled to said decoding means, gate means coupled to said oscillator, and a transducer coupled to said gate for transmitting an ultrasonic output signal in response to an output signal generated by said oscillator in response to the reception of an identification code signal corresponding to the identification code of the person carrying said receiving and decoding means;

said means for transmitting said identification signal to defined areas of surveillance including a plurality of two-way transceivers, each having a first transducer disposed within, one of said separately defined areas of surveillance and a second transducer coupled thereto by a cable and disposed in an adjacent one of said separately defined areas of surveillance for transmitting said radiant wave identification signals in chain reaction throughout said separately defined areas of surveillance in both directions means disposed at a central location within the area of surveillance including means having a transducer for receiving the transmitted locating identification signal, means for decoding said received location identification signal, and means for displaying a plurality of numerical digits corresponding to the identification code of the location from which said location identification signal is transmitted, thereby indicating the location of the person or object carrying said receiving and decoding means.

* * * * *

UNITED STATES PATENT OFFICE
CERTIFICATE OF CORRECTION

Patent No. 3,805,265            Dated April 16, 1964

Inventor(s) Robert W. Lester

It is certified that error appears in the above-identified patent and that said Letters Patent are hereby corrected as shown below:

Column 1, 2nd paragraph, line 2 thereof, cancel "pending", and line 3, cancel "application".
         Column 1, 3rd paragraph, line 1 thereof, change "the applicant" to --- this specification ---.
         Column 4, line 36, change "160,851" to --- 146,040 ---.
         Column 4, line 37, insert --- now Patent No. 3,739,329 --- after "Locating".

Signed and sealed this 31st day of December 1974.

(SEAL)
Attest:

McCOY M. GIBSON JR.　　　　　　　　　C. MARSHALL DANN
Attesting Officer　　　　　　　　　　　Commissioner of Patents